Nov. 24, 1964  C. W. BIRCH  3,157,935
CLOTH EXPANDING ROLL MECHANISM

Filed Sept. 25, 1962  2 Sheets-Sheet 1

Inventor:
Clifford W. Birch,
by Munn H. Hamilton
Attorney

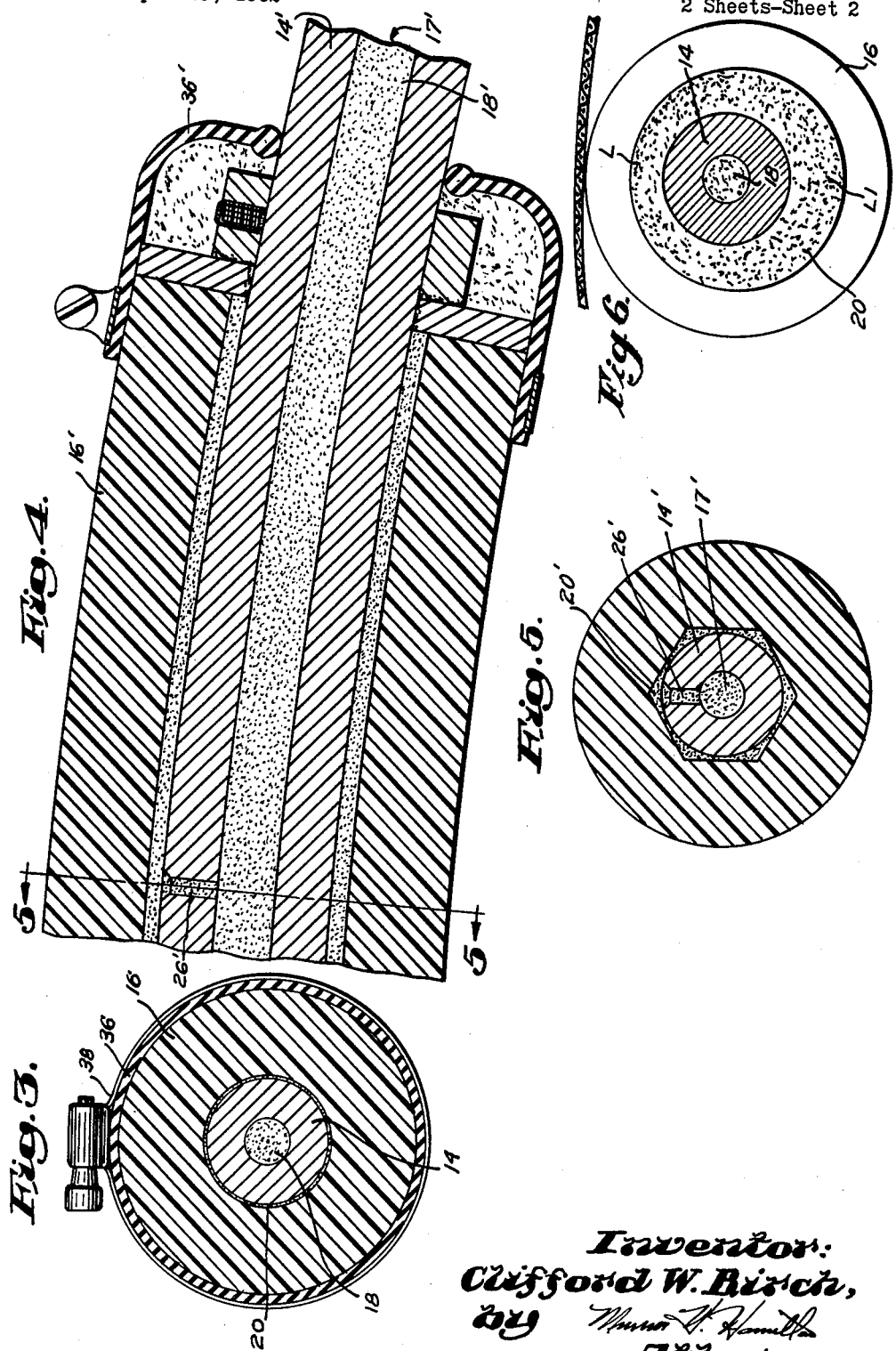

United States Patent Office 3,157,935
Patented Nov. 24, 1964

3,157,935
CLOTH EXPANDING ROLL MECHANISM
Clifford W. Birch, Lexington, Mass., assignor to Birch Brothers, Inc., Somerville, Mass., a corporation of Massachusetts
Filed Sept. 25, 1962, Ser. No. 226,111
3 Claims. (Cl. 26—63)

This invention relates to spreader roll apparatus of the class employed in spreading and stretching a roll of cloth or other material in order to remove wrinkles and provide a uniformly smooth expanded surface throughout the web.

It is a chief object of the invention to devise a simplified form of bowed expander or spreader roll construction which is characterized by a relatively small number of parts and bearing surfaces and which is capable of remaining in operation over extended periods of use. Another object of the invention is to provide sealing means for the ends of an expander roll by means of which injurious chemicals and other corrosive liquids may be completely excluded from inner working surfaces with the result that replacement of parts is minimized and costs of servicing are greatly reduced.

The nature of the invention and its further objects and novel features will be more fully understood and appreciated from the following description of preferred embodiments of the invention selected for purposes of illustration and shown in the accompanying drawings, in which:

FIGURE 3 is a cross section taken on the line 3—3 of FIGURE 2;

FIGURE 4 is another fragmentary cross sectional view similar to FIGURE 2 and illustrating a modified form of flexible sleeve construction;

FIGURE 5 is a cross section taken on the line 5—5 of FIGURE 4; and

FIGURE 6 is a diagrammatic view illustrating fragmentarily a portion of colth undergoing a spreading operation and further indicating a special lubricant body contained between a bowed shaft and a flexible sleeve.

I have discovered that the objectives noted above may be realized in a highly satisfactory manner by locating a cylindrical flexible expander member around a bowed shaft and constantly supporting the inner periphery of the flexible expander member on a thin bearing layer of solid lubricant of the relatively heavy grease consistency of a petroleum jelly such as Vaseline, or the like.

The step of supporting the expander on a lubricant of the heavy grease variety is based on the novel concept of containing in the spreader apparatus several different volumes of lubricant which are held in communication with one another in a unique manner. One volume of lubricant is confined within a special grease compartment extending axially of the fixed bowed shaft. Lubricant is fed into this compartment through suitable self-closing inlet valves to comprise a working reservoir of the material.

A second volume of lubricant is received between the outer periphery of the bowed shaft and the expander member and is supplied from the reservoir in the bowed shaft along ducts which extend through the roll periphery. Still other volumes of lubricant are located at opposite ends of the expander member in communication with the bearing layer of lubricant. These latter volumes of lubricant are confined within sealing housings or boots which are sealably engaged with outer ends of the bowed shaft and each of these latter volumes of lubricant cooperate with its respective sealing housing to seal out and exclude liquid material as well as holding the lubricant layer in a satisfactory manner.

Figure 1:
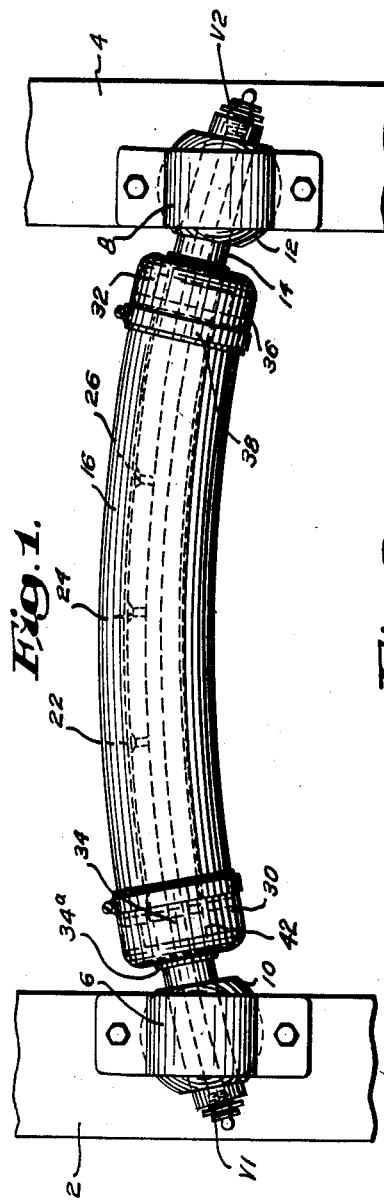
FIGURE 1 is an elevational view of the spreader roll apparatus of the invention.

Considering this arrangement of lubricant volumes in further detail, FIGURE 1 illustrates my improved spreader apparatus, including frame sides 2 and 4, which may be of the type employed in similar conventional machines of this class. Mounted on these frame sides 2 and 4 are bearing members 6 and 8, in which are adjustably fixed opposite ends 10 and 12 of a bowed shaft 14 of the usual arched or curved formation commonly utilized in spreader roll apparatus. The surface 14a of the shaft 14 may, in a preferred form of the invention, be comprised by a thin coating of chrome plating in a thickness of from .002 to .003 inch. This chrome plating is resistant to wear and corrosion and has a desirable coefficient of friction with respect to grease.

Located around the bowed shaft 14 is a flexible expander member 16 in the form of a cylindrical sleeve of neoprene or other rubber-like material which is of an inner diameter slightly greater than the outer diameter of the bowed shaft 14 to form an annular clearance 15. The bowed shaft is of hollow construction which provides a grease compartment 17 extending axially of the shaft. In the lubricant compartment 17 is contained a volume of lubricant 18 of the type noted above. This lubricant is introduced into the lubricant compartment through self-closing valves V1 and V2 of the "Alemite" type using a conventional form of grease injecting equipment.

A second volume of lubricant 20 is contained in the annular clearance 15, and supplied from the reservoir of lubricant 18 through ducts 22, 24, 26, etc., which are transversely formed through the bowed shaft to communicate with the annular clearance.

At either end of the expander member 16 are further provided two other volumes of lubricant 30 and 32, which are contained in a pair of resilient sealing housings or boots 34 and 36.

Figure 2:
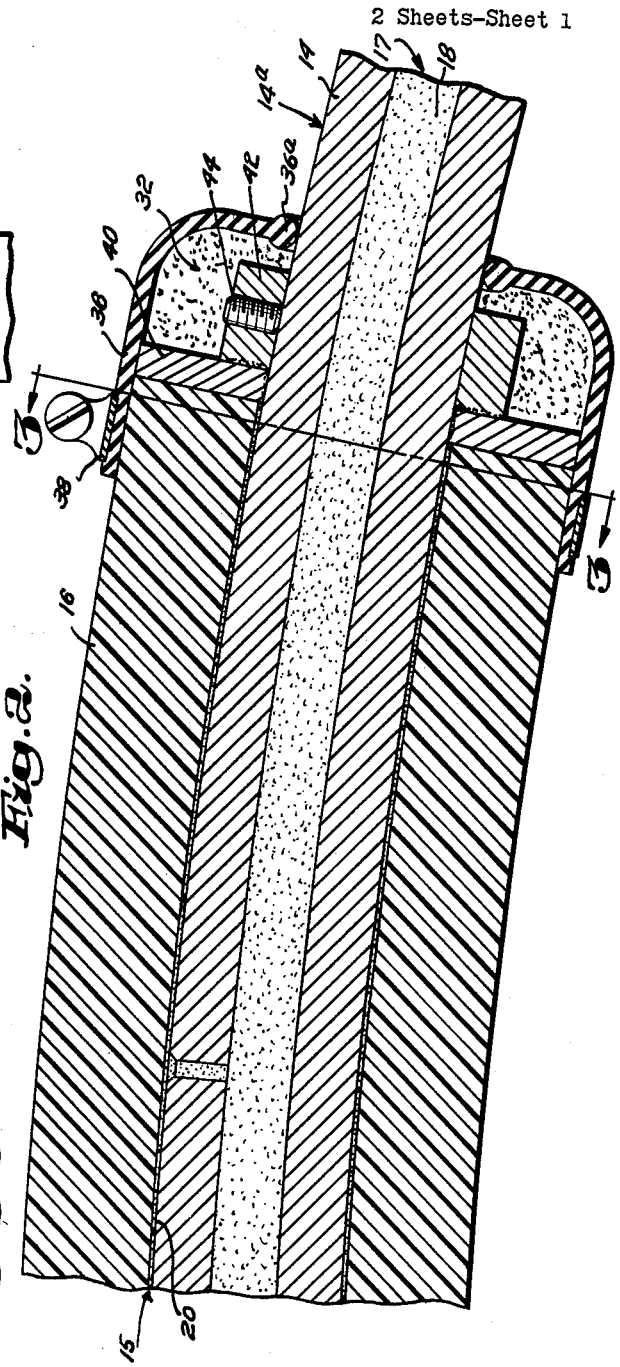
FIGURE 2 is a fragmentary enlarged sectional view taken axially of the spreader roll shown in FIGURE 1.

In FIGURE 2, one of the sealing boots 36 is illustrated in cross section and, as noted therein, comprises a tubular body of rubber or other resilient material such as neoprene extending around the outer periphery of the expander 16 and tightly clamped by means of an adjustable clamping ring 38 so that the sealing boot is arranged to rotate with expander. At its outer end the sealing boot 36 is formed of a reduced diameter to define a ring portion 36a which is of a diameter less than the diameter of the bowed shaft 14, so that a tight seal is realized for sealably retaining the lubricant of volume 32.

The sealing boot 36 also grips and holds an annular thrust plate 40 which is tightly held against an adjacent end of the expander 16 as shown and which has an inner diameter slightly greater than the outer diameter of the bowed shaft. The member 40 thus rotates with the expander and sealing boot and is maintained in place by means of a bearing collar 42 which is solidly fixed to the shaft 14 by means of a screw member 44. A slight clearance is also maintained between the thrust plate 40 and the collar 42, with the result that the lubricant of volume 32 is in communication with the lubricating volume 20. In FIGURES 4 and 5 similar but primed numerals denote expander roll parts at opposite ends of the shaft corresponding to expander roll parts of FIGURES 1–3 inclusive.

By means of this arrangement lubricant introduced through the hollow bowed shaft may enter the clearance between the expander and the bowed shaft, and goes from there between the thrust plate and collar into the space comprised by the sealing boot 36 to constitute a sealing mass.

To start using the spreader apparatus described, assuming the unit is newly installed on a frame, lubricant is supplied through the valve fittings V1 and V2 until a sufficient quantity is present to completely fill volumes 17, 20, 32 and 34. Theerafter, the lubricant valves V1 and V2 are disconnected from the lubricant supply source and the unit is ready to start the web expanding operation and will run for a long period of time wtihout further supply of lubricant or other servicing. In a typical operating period in which the expander member may be rotating at from 1,000 to 2,000 r.p.m., good results have been obtained for periods up to six months and longer.

In this operation the expander rotates on a layer of the lubricant and it will be observed that this layer constantly changes as lubricant is moved back and forth axially along the clearance 20. Axial displacement occurs partly as a result of a constant change in shape of the rotating expander member working around the bowed shaft as shown diagrammatically in FIGURE 6 and particularly indicated by different thicknesses at the top and bottom of the roll. Downwardly directed forces are further exerted by the median portions of the web as it passes over the expander member.

This is illustrated in exaggerated form in FIGURE 6, in which it will be observed that the expander will always exert greatest pressure on the lubricant layer at the upper central portion of the bowed shaft, and this results in a relatively thin portion L of lubricant, while at the under side of the bowed shaft, there is a relatively thick layer L1 of lubricant. Thus it will be seen that a continual change in the lubricant layer takes place. As the expander roll rotates it tends to carry small amounts of lubricant around the shaft from the bottom to the top. As transferred portions of lubricant reach the top of the roll they are compressed and caused to shift axially along the shaft thus preserving a suitable working layer at all times. It will be observed that the layer 20 may be supplied with small quantities of lubricant from the reservoir 18 from time to time, and at the same time the volumes 30 and 32 operate to prevent any substantial displacement of lubricant out of the clearance area.

A further important feature of the invention is the functioning of the volumes 30 and 32 in providing a special sealing action around the bowed shaft 14. These volumes of lubricant, in cooperation with the ring portions 34a and 36a operate, I find, to completely seal out liquid material which may drain out of the web as it passes over the expander roll. In those cases where chemicals or other liquids of a corrosive nature are in the web, the sealing action described becomes a very important improvement adding greatly to the life of the expander apparatus.

Thus it will be apparent that with the apparatus of the invention combined advantages are realized of sealing out liquid materials and maintaining a lubricant layer as a long-life bearing surface which is almost completely free from wear and servicing costs. The apparatus is exceedingly simple to install and put on an operating basis and requires addition of lubricant at infrequent intervals. The latter step may be carried out without interrupting the web spreading operation if desired.

In FIGURES 4 and 5, I have illustrated a modified form of expander apparatus in which a bowed shaft 14' provides a reservoir of lubricant 17' which is released through orifices 26' in the manner already described. Rotatably mounted on the shaft 14' is an expander member 16' which is constructed with an inner lubricant compartment of hexagonal cross section, as shown in FIGURE 5, and which is adapted to contain a volume of lubricant 20'. In this hexagonal type compartment the lubricant is contained in larger quantities at the V portion and as such times as the expander tends to come into contact wiht the bowed shaft 14', only a very small area of engagement is present.

Various other changes and modifications may be resorted to in keeping with the scope of the invention as defined by the appended claims.

I claim:
1. Apparatus of the class described, including a frame, a bowed shaft fixed on the frame in the path of travel of a liquid bearing web, a flexible expander sleeve mounted around the bowed shaft having an inner diameter greater than the outer diameter of said shaft to define an annular clearance therebetween and rotatable when engaged by the traveling web, said shaft being formed with a centrally located compartment and having a reservoir of solid lubricant therein, orifice means for transferring lubricant from said reservoir through the periphery of the bowed shaft to provide in the clearance between the shaft and expander sleeve a thin layer of lubricant which is constantly displaced in directions axially of the shaft during rotative movement of the expander sleeve around the bowed peripheral surface of the shaft due to compression of the expander sleeve towards the shaft, a pair of resilient sealing boot members secured around opposite outer ends of the expander sleeve and rotatable therewith, a pair of plate elements located around the shaft and in abutting relation to opposite ends of the expander sleeve to resiliently confine lubricant in the thin layer between the bowed shaft and flexible expander sleeve, said plate elements being supported for rotation with respective boot members and said sealing boot members having reduced sealing ring portions sealably engaging around adjacent surfaces of the bowed shaft and spaced from the plate elements to form chambers in which small volumes of lubricant are resiliently confined, and lubricant passages connecting the boot chambers and the thin layer of lubricant between the expander sleeve and shaft.

2. Apparatus of the class described, including a frame, a bowed shaft fixed on the frame in the path of travel of a liquid bearing web, a flexible expander sleeve rotatably mounted around the bowed shaft having a greater inner diameter than the outer diameter of said shaft to define and annular clearance therebetween, said shaft being formed with a centrally located compartment and having a reservoir of confined lubricant therein, orifice means for releasing quantities of confined lubricant from said reservoir through the periphery of the bowed shaft to the said clearance to maintain between the shaft and expander sleeve a thin layer of lubricant which is constantly displaced in directions axially of the shaft by pressure of the expander sleeve during rotative movement of the expander sleeve around the bowed peripheral surface of the shaft when contacted by the travelling web, a pair of resilient sealing boot members solidly secured around outer opposite ends of the said expander sleeve and rotatable therewith, said sealing boot members extending outwardly to form tubular enclosure portions having chambers for resiliently containing small volumes of lubricant at either end of said expander sleeve, said enclosure portions including plate means for defining a passageway between the said annular clearance and each of said chambers whereby the small volumes of lubricant are resiliently contained in communication with the thin layer of lubricant between the expander sleeve and shaft, said outer ends of each of the sealing boot members being formed with reduced sealing ring portions for sealably engaging around adjacent surfaces of the bowed shaft, and said resiliently contained small volumes of lubricant and respective sealing ring portions being operative to exclude liquid material removed from the lubricant bearing web while maintaining the quantity of lubricant in the said thin layer at a substantially constant value.

3. An apparatus as defined in claim 1 in which the plate elements consists of respective annular plate members located in spaced relation around the shaft in abutting relation to the said expander sleeve ends and rotatable with respective sealing boot members, and collar elements fixed on opposite ends of the shaft in spaced relation to each of the said plate members thereby to provide a passageway extending radially outwardly between the annular plate members and the collar elements.

References Cited by the Examiner
UNITED STATES PATENTS

| | | | |
|---|---|---|---|
| 306,975 | 10/84 | Thompson | 308—103 |
| 1,186,643 | 6/16 | Anthony | 26—63 |
| 1,572,537 | 2/26 | Joyce | 308—103 |
| 2,054,214 | 9/36 | Buss | 162—197 |
| 2,568,056 | 9/51 | Corder | 308—36.1 X |
| 3,012,301 | 12/61 | Rogers et al. | 26—63 |

FOREIGN PATENTS

| | | |
|---|---|---|
| 407,816 | 1/25 | Germany. |
| 24,496 | 1911 | Great Britain. |
| 436,038 | 10/35 | Great Britain. |
| 436,749 | 10/35 | Great Britain. |

DONALD W. PARKER, *Primary Examiner.*

RUSSELL C. MADER, *Examiner.*